Figure 5:
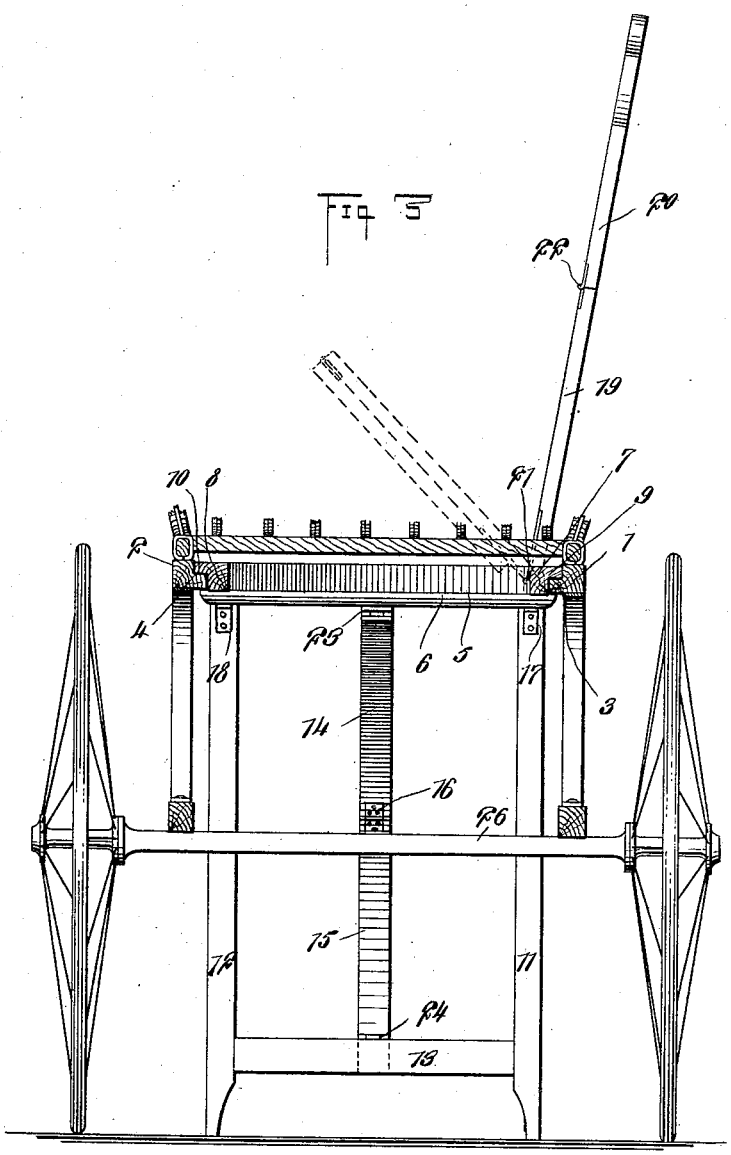

No. 712,917. Patented Nov. 4, 1902.
M. ELWERT.
SEAT ATTACHMENT FOR BABY CARRIAGES.
(Application filed Feb. 3, 1902.)
(No Model.) 2 Sheets—Sheet 1.
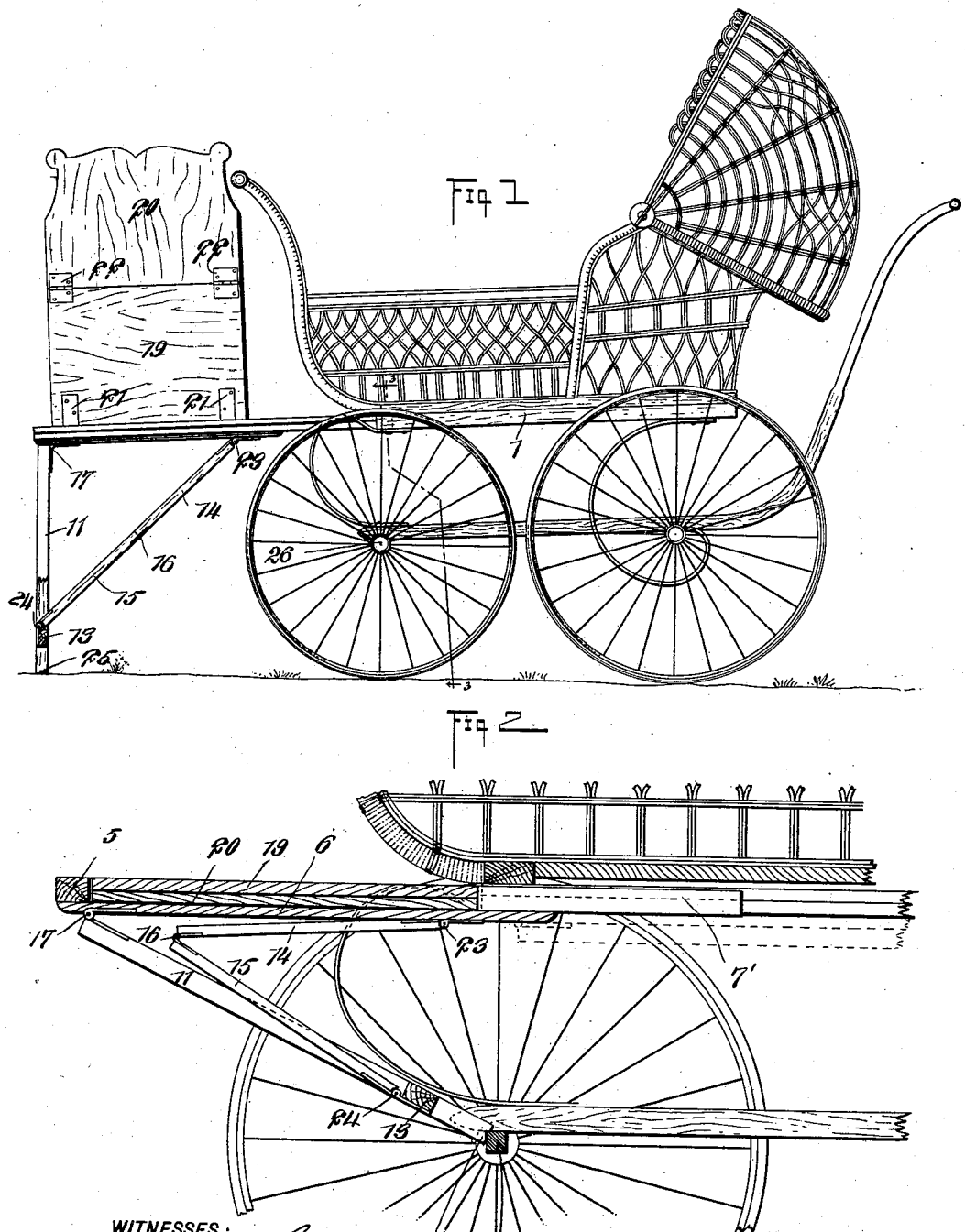
WITNESSES:
INVENTOR
Max Elwert
BY
ATTORNEYS No. 712,917. Patented Nov. 4, 1902.
M. ELWERT.
SEAT ATTACHMENT FOR BABY CARRIAGES.
(Application filed Feb. 3, 1902.)
(No Model.) 2 Sheets—Sheet 2.

WITNESSES:

INVENTOR
Max Elwert
BY
ATTORNEYS

UNITED STATES PATENT OFFICE.

MAX ELWERT, OF LODI, CALIFORNIA.

SEAT ATTACHMENT FOR BABY-CARRIAGES.

SPECIFICATION forming part of Letters Patent No. 712,917, dated November 4, 1902.

Application filed February 3, 1902. Serial No. 92,282. (No model.)

*To all whom it may concern:*

Be it known that I, MAX ELWERT, a citizen of the United States, and a resident of Lodi, in the county of San Joaquin and State of California, have invented a new and Improved Seat Attachment for Baby-Carriages, of which the following is a full, clear, and exact description.

My invention relates to seat attachments for baby-carriages, buggies, go-carts, and similar vehicles, and more particularly to a seat and its attachments whereby a nurse or other attendant may sit down no matter where the vehicle may be situated, the seat being of such structure as to be readily folded and concealed beneath the body of the vehicle.

Reference is to be had to the accompanying drawings, forming a part of this specification, in which similar characters of reference indicate corresponding parts in all the figures.

Figure 1 is a side elevation of a vehicle, showing my attachment in use, certain parts near the ground being broken away. Fig. 2 is a vertical longitudinal section of the same, and Fig. 3 is a vertical cross-section upon the line 3 3 of Fig. 1.

Upon the frame supporting the body of the vehicle the side pieces 1 2 are provided with guideways 3 4, constituting one member of a slide.

The seat consists of a seat proper, 6, which is secured upon a seat-frame consisting of the parts 5, 7, and 8, the parts 7 and 8 being provided with sliding surfaces 9 10, which engage the above-mentioned sliding surfaces 3 and 4. The seat and seat-frame when secured together constitute a slide which can be pushed under the body of the vehicle and moved outwardly therefrom a distance of one and a half or two feet.

A pair of props 11 12 are connected by a cross-bar 13 and are hinged to the seat-frame by hinges 17 18, said props being adapted to fold upwardly beneath the seat-frame, so as to become parallel therewith and to open at right angles to the same. A brace consisting of two members 14 15 is connected by hinges 23 and 24 with the seat and the cross-bar 13. When it is desired to fold the prop, the brace is bent upward by a stroke of the hand and is folded so that the member 15 becomes parallel with the member 14, and the prop by the same motion is meantime pushed upward until it becomes parallel with the seat-frame, so that all of the parts are parallel with each other. Then the seat as a whole, including the prop and brace, can readily be pushed back under the body of the vehicle by means of the slides above described, thus being practically concealed from view.

Upon the seat-frame and secured thereto by the hinges 21 21 is a folding back, preferably made of two members 19 and 20, which are in turn connected together by hinges 22. The top part 20 can be folded upon the lower part 19, so as to become parallel therewith, and the two parts now considered as a unit can be folded downward, so as to become parallel with the seat proper. The two members 7 8 of the seat-frame are of the same height as the two members of the seat-back 19 20 when folded together, so that when the back is folded the top edges of the same will be flush with the top edges of the two members 7 and 8. The manner in which the back is folded is shown by dotted lines in Fig. 3, and the relative position of the two members of the back when folded is shown by the sectional view given in Fig. 2. When desired, the seat can be pushed back a distance partially under the body of the vehicle and the props partially folded, as shown in Fig. 2, and a notch 25 in the lower ends of the props can be brought into engagement with the stationary axle 26 of the vehicle. The props in this position will act as braces for sustaining the free end of the sliding seat, and the braces proper, consisting of the parts 14 and 15, will be idle. In this position the seat can be used as a bundle-carrier or as a table.

This is a light, cheap, and durable construction, and it can be applied to old vehicles or to cheap new vehicles at a comparatively small cost. Of course, if desired, it can be made of any degree of refinement and can be ornamented as desired. By means of this device a mother or nurse can take a child to the park, and if the seats are crowded can readily make a seat for herself at any point where she can find a resting-place for the vehicle. For service at picnics the carriage admits of various uses. It can be used as a table, as above mentioned, and the several offices which may be performed by the structure will be apparent to any person accustomed to the handling of a baby-vehicle.

Having thus described my invention, I claim as new and desire to secure by Letters Patent—

1. A seat attachment for baby-vehicles, comprising a seat slidably connected to the frame of the vehicle, a folding prop secured to said seat for supporting the same from the ground, and a folding brace secured to said prop and said seat, for holding them in a predetermined position.

2. A seat attachment for baby-vehicles, comprising a slidable seat, a folding prop secured to one end of the same, and a folding brace secured to the other end of said seat and to the free end of said prop, for bracing said seat and said prop at a definite angle to each other.

3. A seat attachment for baby-vehicles, comprising a slidable seat, and a folding prop secured to one end of the same, said prop being provided with a free end for engaging the ground, and with a notch for engaging a relatively stationary part of the vehicle.

4. A seat attachment for baby-vehicles, comprising a slidable seat, a prop hinged thereto and free to fold beneath the seat and parallel therewith, and a brace connecting said seat and said prop, said brace being free to fold parallel to said seat and said prop.

5. A seat attachment for baby-vehicles, comprising a slidable seat, a prop hinged thereto and free to fold beneath the seat and parallel therewith, and a brace connecting said seat and said prop, said brace being in two parts connected by a hinge and free to fold by means of said hinge, so that the said seat, prop and both portions of the brace may be folded together.

6. A seat attachment for baby-vehicles, comprising a pair of guideways located upon the body of the vehicle, a seat provided with slide members for engaging said guideways, and a folding prop for supporting said seat, said prop being free to fold against the seat, and the seat being free to slide into a concealed position.

7. A seat attachment for baby-vehicles, comprising a seat, and a back for the same, said back being made of a plurality of members, free to fold upon each other, and a folding prop for supporting said seat from the ground.

8. A seat attachment for vehicles, comprising a sliding seat, a prop hinged thereto and provided with a notch for engaging a stationary part of the vehicle, and a folding brace secured to said prop and to said seat, said brace being idle when said prop engages the said stationary part of the vehicle, and being brought into service when said notch is disengaged from said stationary part of the vehicle, and moved into a position at right angles to the seat.

In testimony whereof I have signed my name to this specification in the presence of two subscribing witnesses.

MAX ELWERT.

Witnesses:
GEO. W. LeMOIN,
A. O. EDDLEMAN.